(12) United States Patent
Liu

(10) Patent No.: US 7,261,918 B2
(45) Date of Patent: Aug. 28, 2007

(54) METHODS OF FORMING LANTHANUM-MODIFIED LEAD ZIRCONIUM TITANATE (PLZT) LAYERS

(75) Inventor: Kuo-Chuan Liu, Fremont, CA (US)

(73) Assignee: Fujitsu Limited, Kanagawa (JP)

( * ) Notice: Subject to any disclaimer, the term of this patent is extended or adjusted under 35 U.S.C. 154(b) by 242 days.

(21) Appl. No.: 10/871,405

(22) Filed: Jun. 18, 2004

(65) Prior Publication Data
US 2005/0281943 A1    Dec. 22, 2005

(51) Int. Cl.
*B05D 3/02* (2006.01)
*B05D 3/04* (2006.01)

(52) U.S. Cl. .................. 427/226; 427/379; 427/380
(58) Field of Classification Search .............. 427/226, 427/379, 380
See application file for complete search history.

(56) References Cited

U.S. PATENT DOCUMENTS

2001/0016229 A1* 8/2001 Sun et al. ................ 427/376.2

OTHER PUBLICATIONS

Journal of Materials Science, Kurchania et al, vol. 33, 1998, pp. 659-667.*
Journal of Materials Research, Jacobs et al, vol. 18, #6, Jun. 2003, 1405-1411.*
K.M. Satyalakshmi, et al., "Epitaxial metallic LaNiO3.thin films grown by pulsed laser deposition," Appl. Phys. Lett. Mar. 15, 1993, pp. 1233-1235, vol. 62, No. 11.
C.C. Yang, et al., Preparation of (100)-oriented metallic LaNiO3 thin films on Si substrates by radio frequency magnetron sputtering for the growth of textured Pb(Zr0.53Ti0.47)O3 pp. 2643-2645, vol. 66, No. 20.
Y.L. Tu, et al., "Synthesis and Electrical Characterization of Thin Films of PT and PZT Made from a Diol-Based Sol-Gel Route," J. Am. Ceram. Soc., Feb. 1996, pp. 441-448, vol. 79, No. 2.
A. Li, et al., "Preparation of perovskite conductive LaNiO3 films by metalorganic decomposition," Appl. Phys. Lett., Mar. 4, 1996, pp. 1347-1349, vol. 68, No. 10.
M.S. Chen, et al., "Effect of textured LaNiO3 electrode on the fatigue improvement of Pb(Zr0.53Ti0.47)O3 thin films," Appl. Phys. Lett., Mar. 4, 1996, pp. 1430-1432, vol. 68, No. 10.
T.F. Tseng, et al., "Effect of LaNiO3/Pt double layers on the characteristics of (PbxLa1-x)(ZryTi1-y)O3 thin films," Appl. Phys. Lett., Apr. 1996, pp. 2505-2510, vol. 68, No. 18.
A. Li, et al., "Preparation of epitaxial metallic LaNiO3 films on SrTiO3 by metalorganic decomposition for the oriented growth of PbTiO3," Appl. Phys. Lett., Jul. 8, 1996, pp. 161-163, vol. 69, No. 2.
T. Yu, et al., "Epitaxial Pb(Zr0.53Ti0.47)O3/LaNiO3 heterostructures on single crystal substrates," Appl. Phys. Lett., Sep. 30, 1996, pp. 2092-2094, vol. 69, No. 14.
Y.L. Tu, et al., "Processing and characterization of Pb(Zr, Ti)O3 films, up to 10 mm thick, produced from a diol sol-gel route," J. Mater. Res., Oct. 1996, pp. 2556-2564, vol. 11, No. 10.
A. Li, et al., "Fabrication and electrical properties of sol-gel derived BaTiO3 films with metallic LaNiO3 electrode," Appl. Phys. Lett., Mar. 24, 1997, pp. 1616-1618, vol. 70, No. 12.
C. R. Cho, et al., "Solution deposition and heteroepitaxial crystallization of LaNiO3 electrodes for integrated ferroelectric devices," Appl. Phys. Lett., Nov. 17, 1997, pp. 3013-3015, vol. 71, No. 20.
R. Kurchania, et al., "Synthesis of (Pb,La) (Zr,Ti)O3 films using a diol based sol-gel route," J. Mater. Sci., Feb. 1998, 659-667, vol. 33, No. 3.
C.H. Lin, et al., "Domain structure and electrical properties of highly textured PbZrxTi1-xO3 thin films grown on LaNiO3-electrode-buffered Si by metalorganic chemical vapor deposition," J. Mater. Res., Jan. 2000, pp. 115-124, vol. 15, No. 1.
S.S. Kim, et al., "Structures and properties of (00I)-oriented Pb(Zr, Ti)O3 films on LaNiO3/Si(001) substrates by pulsed laser deposition," J. Mater. Res., Dec. 2000, pp. 2881-2886, vol. 15, No. 12.
G.S. Wang, et al., "Properties of highly (100) oriented Ba0.9Sr0.1TiO3/LaNiO3 heterostructures prepared by chemical solution routes," Appl. Phys. Lett., Jun. 2001, pp. 4172-4174, vol. 78, No. 26.
R.N. Jacobs, et al., "Role of PB excess in the crystallization of lead zirconate titanate films derived via sol-gel processing," J. Mater. Res., Jun. 2003, pp. 1405-1411, vol. 18, No. 6.

* cited by examiner

*Primary Examiner*—Fred J. Parker
(74) *Attorney, Agent, or Firm*—Sheppard, Mullin, Richter & Hampton LLP

(57) ABSTRACT

Methods and solutions for forming lanthanum-modified lead zirconium titanate (PLZT) layers are disclosed. The PLZT layers are highly transparent to 1550 nm wavelength light, and have high crystal quality. Loss factors as low as 0.25 dB per mm are achieved. Fast and low-cost methods are disclosed for making the layers. Devices structures using the layers are also disclosed.

34 Claims, 4 Drawing Sheets

METHODS OF FORMING LANTHANUM-MODIFIED LEAD ZIRCONIUM TITANATE (PLZT) LAYERS

FIELD OF THE INVENTION

The present invention relates to thin-film structures that comprise a ferroelectric material and methods for making the same. The structures preferably comprise electro-optical devices, but may comprise electrical, magnetic, electromagnetic, and electro-mechanical devices. The present invention more particularly relates to lanthanum-modified lead zirconium titanate (PLZT) disposed over metallic lanthanum nickel oxide ($LaNiO_3$).

BACKGROUND OF THE INVENTION

Several types of optical communication devices comprise optical waveguides, optical modulators, and optical switching structures made of electro-optic material. A substrate optical waveguide comprises a lower cladding layer formed on the substrate, a core layer having a higher index of refraction formed over the lower cladding layer, and usually an upper cladding layer formed over the core layer. An optical modulator, or an optical switching structure, may be formed in line with the optical waveguide by forming a body of electro-optic (E/O) material on the same level as the core material, with the electro-optic material usually sandwiched between upper and lower cladding layers. Two electrodes are formed on opposing surfaces of the body E/O material, and are used to apply an electric field to the E/O body. The electric field changes selected optical properties (e.g., refractive index, polarization) of the E/O material. The changes in optical properties may be used to achieve various types of modulating, switching, and filtering functions.

A coefficient may be used to relate the change in the optical property of the material with respect to the applied electric field (i.e., the applied voltage divided by the dimension of the material along which the voltage acts). Electro-optic materials are usually crystalline or highly ordered materials (as in the case of polymers). In both cases, the value of the electro-optic coefficient usually depends upon the direction of the electric field relative to the orientation of the material's crystal or highly-ordered structure. Because of this, the electro-optic property is usually specified as a matrix of coefficient values, each of which is measured along a different axis of the material's crystal or ordered structure. This matrix is often called the tensor matrix of the material's property.

In electro-optic devices used in large systems integrated on substrate carriers, the E/O material usually comprises an inorganic single crystalline material, such as lithium niobate, which is difficult to grow and pattern. Single crystalline materials cannot be easily formed on substrate carriers, and must be grown on top of a base crystalline substrate in order to cause the material to form a crystalline structure that follows that of the substrate. Additionally, lithium niobate has a relatively low responses to the applied electric field compared to other inorganic crystalline materials, such as lanthanum-modified lead zirconium titanate (PLZT). However, conventionally grown PLZT layers have relatively high optical losses in the 1550-nm wavelength band, which is a common wavelength for optical communications. The optical loss generally exceeds 2 dB per millimeter of distance traveled through the PLZT layer. Also, the film thickness of the conventionally grown PLZT is so thin that special efforts are need to couple light into the film. In addition, the conventional deposition method usually cannot provide a high quality PLZT film on a large scale substrate. This inability limits the potential for mass production of PLZT films. Thus, the high optical loss value and these geometrical factors limit the practical use of PLZT material in integrated optics applications.

SUMMARY OF THE INVENTION

Accordingly, as part of making his invention, the inventor has recognized a need in the optical switching art for an electro-optical material that has both a high electro-optic coefficient and a low optical loss factor, and that is relatively inexpensive to form on substrates. The inventor has also recognized that the capability of forming thicker PLZT layers, while still maintaining high optical quality, would facilitate coupling of light to the material. In addition, the inventor has recognized that enabling PLZT layers to be formed over large substrate areas, while still maintaining high optical quality, would enable PLZT materials to be used in integrated optics applications.

In one aspect according to the present application, there are provided solutions for forming PLZT films. An exemplary solution comprises a first number of lead (Pb) atoms, at least some of said atoms being in chelated forms, a second number of lanthanum (La) atoms, at least some of said atoms being in chelated forms, a third number of zirconium (Zr) atoms, at least some of said atoms being in chelated forms, and a fourth number of titanium (Ti) atoms, at least some of said atoms being in chelated forms. The exemplary solution has a stoichiometric target for the number of lead atoms, where the stoichiometric target is equal to the number of zirconium atoms plus the number of titanium atoms minus 75% of the number of lanthanum atoms. In addition, in the solution, the first number of lead atoms is in the range of 122% to 130% of the stoichiometric target. This first aspect enables the formation of PLZT layers with high optical transparency, high electro-optic coefficients, and high material quality.

In a second aspect according to the present application, there are provided methods of forming PLZT layers. An exemplary method comprises the step of coating a substrate with a solution that comprises lead atoms, lanthanum atoms, zirconium atoms, titanium atoms, and one or more diol compounds to form a material layer. The exemplary method further comprises the steps of heating the material layer to a temperature above room temperature and less than or equal to 400° C. for a first period of time, and thereafter heating the material layer to a temperature of 500° C. or more in an oxygen-rich atmosphere for a subsequent second period of time. The solution according to the first aspect of the present application may be used in this second aspect of the present application. The second aspect enables the formation of PLZT layers with high optical transparency and quality to be done in an inexpensive and rapid manner. In addition, the step of firing in an oxygen-rich atmosphere enhances the optical transparency, electro-optic properties, and crystalline quality of the PLZT layer that can be achieved with solutions according to the first aspect of the present application.

In a third aspect according to the present application, there are provided methods of forming the solutions used to form PLZT layers, with each solution comprising lead atoms, lanthanum atoms, zirconium atoms, titanium atoms, and one or more diol compounds. An example of such a method comprises a step of mixing lead acetate, lanthanum acetylacetonate, and a first diol to form a first solution such that at least a portion of the lead acetate at least a portion of and lanthanum acetylacetonate are dissolved in the first solution. The exemplary method also comprises a step of mixing zirconium n-propoxide, titanium di-isopropoxide bis-acetylacetonate, and a second diol to form a second solution such that at least a portion of the zirconium n-propoxide and at least a portion of titanium di-isopropoxide bis-acetylacetonate are dissolved in the second solution. The steps of forming the first and second solutions may occur in any order or simultaneously. The exemplary method also comprises a steps of combining the first and second solutions and refluxing at a temperature above room temperature to form a third solution. The third aspect of the present application provides for inexpensive ways of manufacturing the solutions according to the first aspect of the present invention. In preferred implementations of this embodiment, each solid chemical compound is complete dissolved in its respective first or second solution, where the term "completely dissolved" means that there is no visible sign, as viewed by ordinary sight, of the initial solid form of the chemical compound.

Each of the first and second aspects of the present application provides for a device comprising a substrate and a layer of PLZT material formed over the substrate, with the layer having a non-amorphous microstructure that comprises grains of crystalline material, and further having an optical loss factor equal to or less than 1 dB/mm for light having a wavelength of 1550 nm. Preferred combinations of the first and second aspects provide for such devices with loss factors equal to or less than 0.6 dB/mm, and even as low as 0.25 dB/mm.

Accordingly, it is an object of the present invention to enable the construction of PLZT layers with high optical transparency, high electro-optic coefficients, and high material quality.

It is another object of the present invention to enable the construction of such PLZT layers at a low cost and at high throughput.

It is another object of the present invention to provide the precursor solutions for the construction of PLZT layers of high optical transparency, high electro-optic coefficients, and high material quality.

It is yet another object of the present invention to enable the inexpensive manufacture of such precursor solutions.

These and other objects and advantageous effects of the present inventions will become apparent to one of ordinary skill in the art in view of the following detailed description.

DETAILED DESCRIPTION OF THE INVENTION

Electro-optical (E/O) thin-film planar waveguides comprising lanthanum-modified lead zirconium titanate (PLZT) could potentially have substantially better performance than other electro-optical materials because of the material's large electro-optic coefficients. However, this material cannot be grown over conventional electrode materials, and so the alternative has been to use lateral electrodes (see for example, FIG. 9), which have the above-noted disadvantages.

Figure 1:
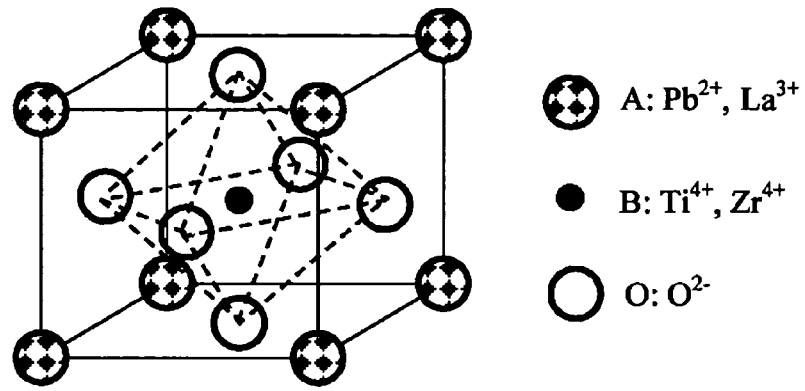
FIG. 1 shows the perovskite structure of lanthanum-modified lead zirconium titanate (PLZT).

PLZT has a perovskite crystal structure, a unit cell of which is shown in FIG. 1. Lead (Pb) and lanthanum (La) atoms are disposed at the eight vertices of the outer cube of the perovskite structure, which are referred to as the "A" sites. Each of these atoms are shared by seven other unit cells. However, each unit cell shares eight such atoms at a $\frac{1}{8}^{th}$ share, which results in one lead (Pb) or lanthanum (La) atom being effectively allocated to each unit cell. Lead and lanthanum are referred to as "A"-site atoms. Next, either a zirconium atom or a titanium atom is disposed substantially at the center of the unit cell. The center of the unit cell is referred as a "B" site, and titanium and zirconium are referred to as "B"-site atoms. A "B"-site atom is not shared between adjacent unit cells. Finally, oxygen atoms are disposed at the centers of the six faces of the unit cell, which are referred to as "O" sites. Each oxygen atom is shared between two adjacent units cells, which results in three oxygen atoms being effectively allocated to each unit cell.

The inclusion of lanthanum atoms causes some of the "B" sites to be unfilled by zirconium or titanium atoms, thereby causing vacancies at some of the "B" sites. On average, for every four lanthanum atoms added to the crystal structure, one "B"-site vacancy is created. Charge balancing within the crystal causes this process to occur. The three oxygen atoms effectively allocated to the unit cell provide a total of six unfilled electron sites in their valence shells. These unfilled electron sites are filled by electrons shared from the metal atoms. In a crystal with no lanthanum atoms, the one effective lead (Pb) atom per the unit cell provides two of the six electrons, and the one titanium atom or one zirconium atom per the unit cell provides the other four electrons. When a lanthanum atom is added, it substitutes for a lead (Pb) atom on an "A" site, and provides three electrons instead of two electrons. Thus, in terms of filling the unfilled electron sites of the oxygen valence shells, the addition of four lanthanum atoms adds four extra electrons, which then eliminates the need for one titanium atom or one zirconium atom. Because of this, it is energetically favorable for the PLZT crystal to minimized its crystal energy, and thereby increase its stability, by leaving one "B" site vacant for every four lanthanum atoms added to the crystal, on average.

As such, the chemical formula of the PLZT crystal materials formed herein can be represented by the formula: $Pb_{(1-X)}La_X(Zr_{(1-Y)}Ti_Y)_{(1-X/4)}O_3$. Here, the last subscript "(1−X/4)" indicates that the total number of zirconium and titanium atoms is reduced by one atom for every four atoms of lanthanum present within the crystal. That is to say that the number of "B"-site atoms ($N_B$) is reduced by one atom for every four atoms of lanthanum added to the crystal. As a consequence, the ratio of the number of "B"-site atoms actually in the crystal to the number of "A"-site atoms ($N_A$) in the crystal is $(1-X/4)$—that is to say, $N_B/N_A=(1-X/4)$. In one aspect of the present invention, precursor solutions for PLZT material will be formed and used, with these precursor solutions having an amount of lead (Pb) in excess of that needed by the crystal stoichiometry: $Pb_{(1-X)}La_X(Zr_{(1-Y)}Ti_Y)_{(1-X/4)}O_3$. Given the mole fraction (X) of lanthanum atoms desired for the solution and the total number of "A"-site atoms to be provided in the formed PLZT crystal per unit volume of the precursor solution, the number of lead (Pb) atoms needed (per unit volume of the precursor solution) for the above crystal stoichiometry is $(1-X)*N_A$. We call the quantity $(1-X)*N_A$ the stoichiometric target for the number of lead atoms in the precursor solution per unit volume of solution, with the excess lead (Pb) being the number of atoms above this stoichiometric target. As to the other metal atoms, the stoichiometric target for the number of lanthanum atoms in the precursor solution per unit volume is $X*N_A$, the stoichiometric target for the number of zirconium atoms in the precursor solution per unit volume is $(1-Y)*(1-X/4)*N_A=(1-Y)*N_B$, and the stoichiometric target for the number of titanium atoms in the precursor solution per unit volume is $Y*(1-X/4)*N_A=Y*N_B$. Preferred precursor solutions according to aspects of the present invention do not use amounts of lanthanum, zirconium, and titanium that are in excess of their stoichiometric targets.

In one general set of embodiments of the present invention, a PLZT precursor solution with 22% to 30% excess lead atoms is coated on a substrate, then soft-baked, and thereafter rapidly fired in an oxygen-rich atmosphere for two to four minutes. Thick layers of PLZT material suitable for optics applications can be formed by repeating these three basic steps. The PLZT layer to be formed has a chemical form of $Pb_{(1-X)}La_X(Zr_{(1-Y)}Ti_Y)_{(1-X/4)}O_3$, as indicated above. The lanthanum mole fraction "X" is generally in the range of 0.04 to 0.12, preferably in the range of 0.06 to 0.10, and more preferably in the range of 0.07 to 0.09, with a value of 0.08 being used in constructed examples described below. The titanium mole fraction "Y" is generally in the range of 0.25 to 0.6, and preferably in the range of 0.3 to 0.5 or 0.4 to 0.5, with a value of 0.35 being used in constructed examples described below. The soft-baking step removes solvents in the PLZT precursor solution, and de-bonds and evaporates off an amount of the chelating agents used in the precursor solution (the chelating agents are described below in greater detail). In the firing step, the atmosphere surrounding the precursor layer is preferably oxygen rich with an oxygen molar fraction of at least 0.4, and preferably of at least 0.6, and most preferably of at least 0.9. After the firing step, the material layer has a polycrystalline morphology (form) comprising grains of crystalline material. The crystal structure of each grain comprises a perovskite structure, which is shown in FIG. 1.

Characteristics of the Precursor Solution.

The precursor solution comprises lead atoms, lanthanum atoms, zirconium atoms, and titanium atoms in chelated forms (i.e., existing as chelates), dispersed in one or more solvents. In an exemplary embodiment, the chelating agents comprise acetate, acetylacetonate, and diol compounds, with some of the metal atoms linked to one another by the chelating agents. Methods for forming exemplary precursor solutions are described below in greater detail. While it is currently preferred to use the metal atoms in their chelated forms, small amounts of one or more of the metals in oxidized form may be added to the precursor solution. The solution comprises a number $N_{Pb}$ of lead atoms, a number $N_{La}$ of lanthanum atoms, a number $N_{Zr}$ of zirconium atoms, and a number $N_{Ti}$ of titanium atoms, which are most conventionally denoted in moles. The number of "A"-site atoms $N_A$ and the number of "B"-site atoms $N_B$ are also conventionally denoted in moles. With $N_A$ and $N_B$ following the relationship $N_B/N_A=(1-X/4)$, the numbers follow the following relationships (1)-(6):

$$N_{Ti}=Y*(1-X/4)*N_A=Y*N_B \quad (1)$$

$$N_{Zr}=(1-Y)*(1-X/4)*N_A=(1-Y)*N_B \quad (2)$$

$$N_B=N_{Ti}+N_{Zr} \quad (3)$$

$$N_{Ti}/N_{Zr}=Y/(1-Y) \quad (4)$$

$$N_{La}=X*N_A=X*N_B/(1-X/4)=X*(N_{Ti}+N_{Zr})/(1-X/4) \quad (5)$$

$$N_{Pb}=Z*(1-X)*N_A=Z*(N_A-N_{La})=Z*\{N_B/(1-X/4)-N_{La}\} \quad (6)$$

where Z is in the range of 1.22 to 1.30.

With Z being in the range of 1.22 to 1.30, the number $N_{Pb}$ of lead atoms is in the range of 122% to 130% of the stoichiometric target for lead atoms, with the amount of excess lead atoms being in the range of 22% to 30%. (The quantity $\{(Z-1)/Z\}*100\%$ represents the percentage of excess lead in the precursor solution.)

The above relationships may be used to form precursor solutions as follows. One may start by selecting the total number of "A"-sites to be created per unit volume of precursor, and assigning the value of $N_A$ to this number. Next, values of X, Y, and Z are selected. Then, the numbers of the metal atoms are computed as follows: $N_{Pb}=Z*(N_A-N_{La})$, $N_{La}=X*N_A$, $N_{Ti}=Y*(1-X/4)*N_A$, and $N_{Zr}=(1-Y)*(1-X/4)*N_A$. As another approach, one may selected values of X, Z, $N_{Ti}$ and $N_{Zr}$ (the latter two values implicitly providing Y), and then set $N_{La}=X*N_B/(1-X/4)$, and $N_{Pb}=Z*\{(N_{Ti}+N_{Zr})/(1-X/4)-N_{La}\}$. (As will become apparent from the next paragraph, the last relation may be written as $N_{Pb}=Z*\{N_{Ti}+N_{Zr}-0.75*N_{La}\}$).

After making a precursor solution, one can verify that the excess amount of lead (Pb) falls within the range specified by Z as follows. A chemical analysis is performed to determine the number of each metal atom ($N_{Pb}$, $N_{La}$, $N_{Ti}$, $N_{Zr}$) per unit volume of precursor solution. Using equation (5), X for the solution may be calculated as $X=N_{La}/(N_{Ti}+N_{Zr}+0.25*N_{La})$, and Y may be calculated as $Y=N_{Ti}/(N_{Ti}+N_{Zr})$. Then, the stoichiometric target for lead (Pb), denoted herein as $ST_{Pb}$, may be calculated as:

$$ST_{Pb}=\{(N_{Ti}+N_{Zr})/(1-X/4)-N_{La}\}. \quad (7)$$

One may then compute Z as $N_{Pb}/ST_{Pb}$, and check to see if it is within the preferred range of 1.22 to 1.30. Through application of algebra, equation (7) may be simplified as $ST_{Pb}=N_{Ti}+N_{Zr}-0.75*N_{La}$. This may be intuitively understood as follows. If the addition of lanthanum did not cause "B"-site vacancies to occur, then we would have a case of $ST_{Pb}+N_{La}=N_A$ and $N_{Ti}+N_{Zr}=N_A$ (because $N_B$ would be equal $N_A$). However, the addition of every 4 lanthanum atoms reduces, on average, the total of $N_{Ti}+N_{Zr}$ by one atom. Thus, in reality, the crystal substantially follows the relation: $N_{Ti}+N_{Zr}=N_A-0.25*N_{La}$. Using this relation with $ST_{Pb}+N_{La}=N_A$ results in $ST_{Pb}=N_{Ti}+N_{Zr}-0.75*N_{La}$.

For a PLZT layer made with 22% to 30% excess lead ($N_{Pb}$ in the range of 122% to 130% of the stoichiometric target $ST_{Pb}$ for lead atoms), the inventor found that the optical loss to 1550-nm light was significantly lower than that for PLZT without excess lead (Pb). This was an unexpected and surprising result, which is not anticipated or predicted by any of the prior art of which the inventor is aware. Moreover, the inventor found that the optical loss for PLZT layers made with precursor solutions having 22% to 30% excess lead was significantly lower than the optical loss for PLZT layers made with only 10%, 15%, or 20% excess lead (Pb), particularly for precursor solutions having 23% to 28% excess lead. This also was an unexpected and surprising result, which is not anticipated or predicted by any of the prior art of which the inventors are aware. The inventors believe that high excess lead in combination with the rapid firing for a short period of time (two to four minutes, including temperature ramp up and ramp down) in an oxygen-rich environment, enables an unknown mechanism to form a crystal structure having dramatically lower optical losses, and likely causes the resulting PLZT layer to have a lead concentration that exceeds the target stoichiometric value, but that is less than the excess value in the precursor solution. With respect to the latter point, it is believed that some of the lead (Pb) is lost through an oxidation process during the firing step.

Through his investigations, the inventor currently believes that precursor solutions having 23% to 28% excess lead provide better results than precursor solutions having 22%, 29% or 30%, and that precursor solutions having 24% to 26% excess lead provide still better results. To achieve a precursor solution with 23% to 28% excess lead, the number $N_{Pb}$ of lead atoms is in the range of 123% to 128% of the stoichiometric target for lead atoms. Similarly, to achieve a precursor solution with 24% to 26% excess lead, the number $N_{Pb}$ of lead atoms is in the range of 124% to 126% of the stoichiometric target for lead atoms.

In the above ranges of excess lead (Pb), the number of lanthanum atoms ($N_{La}$) is in the range of 7% to 9% of the combined number of zirconium atoms and titanium atoms ($N_{Ti}+N_{Zr}$), and preferably around 8%. However, a range of 6% to 10% may be used, and even a range of 4% to 12% may be used.

The precursor solutions may have a viscosity in the range of 2 to 30 centipoise (cp), with a preferred range of 5 to 15 cp. The solution are typically clear and optically transparent with light to dark orange color. The organic molecules and clusters are preferably freely suspended within the solution. When shining a laser beam through the solution, the laser beam path can be identified by the scattering of these clusters. In constructed examples of the precursor solutions, as described below, the inventor found no precipitation occurred in the solution for at least three months at room temperature.

Optical Layer Formation Process

Figure 2:
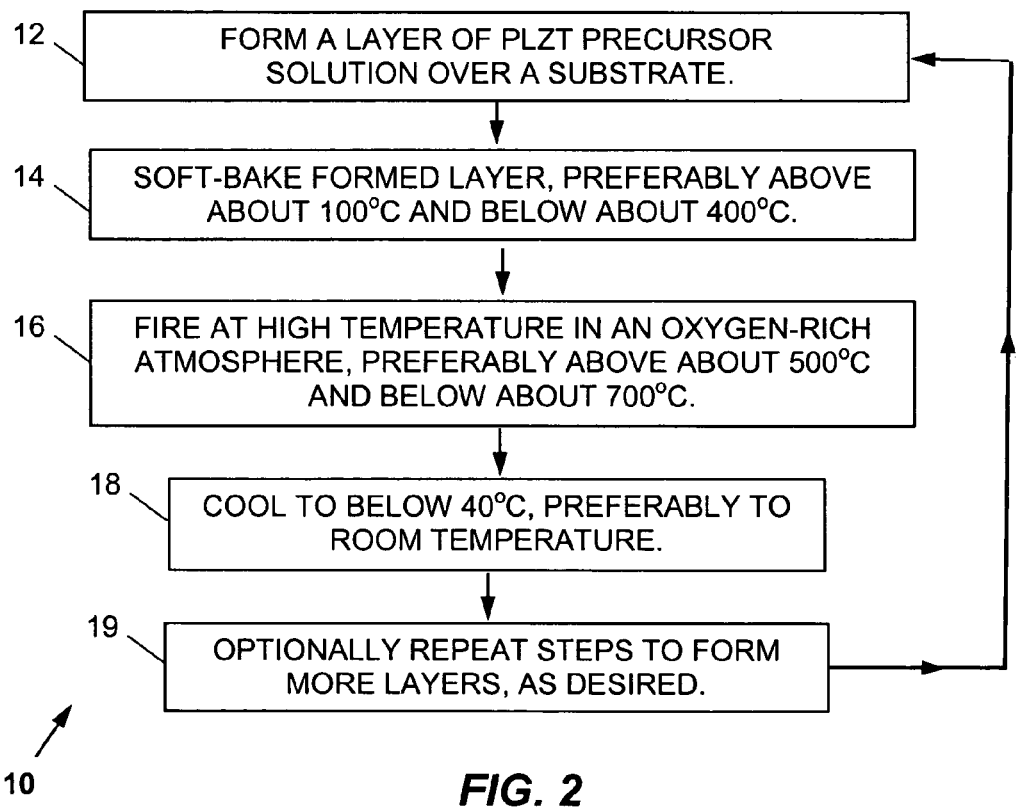
FIG. 2 shows a flow diagram of an exemplary method of forming PLZT layers according to an invention of the present application.
Figure 3:
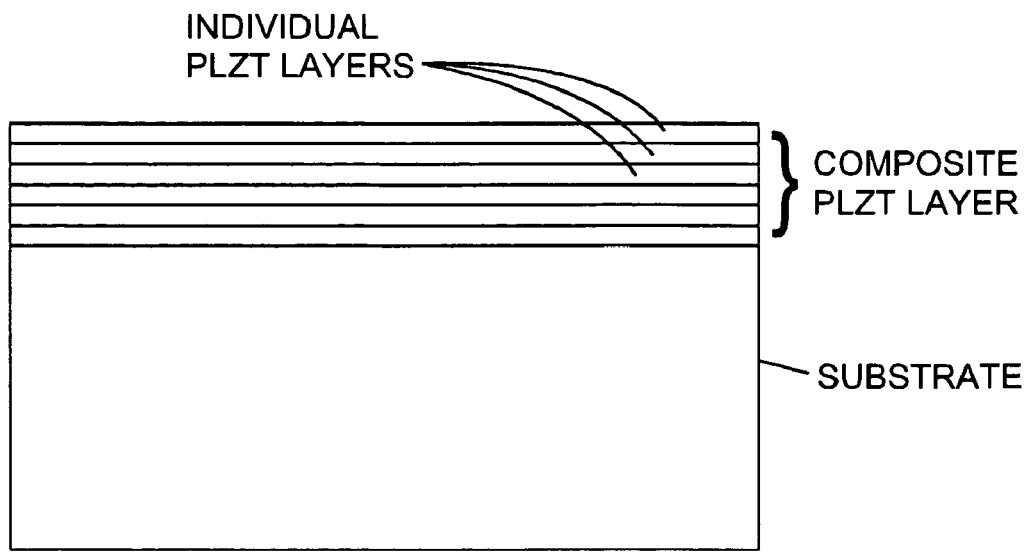
FIG. 3 shows the composite PLZT layer formed from the exemplary method illustrated in FIG. 2 according to an invention of the present application.

In preferred embodiments, a thick layer of PLZT optical material is formed by a build-up of several thin layers, as illustrated by the exemplary method 10 shown in FIG. 2, which comprises steps 12, 14, and 16, and optional steps 18 and 19. Each thin layer is formed by a step of coating a substrate with one of the above-described precursor solutions to form a material layer, as illustrated at 12 in FIG. 2, followed by a step of soft-baking the material layer as illustrated at 14 in FIG. 2, and followed by a step of firing the material layer at a high temperature in an oxygen-rich atmosphere, as illustrated at 16 in FIG. 2. Each of these steps is described below in greater detail. The layer and substrate are then cooled down to a temperature below 40° C. (preferably room temperature), as shown at 18 in FIG. 2. The steps 12-18 may be repeated as desired to form additional layers, resulting in a composite PLZT layer, as shown in FIG. 3. After the firing step, each thin layer may have a thickness of 0.1 μm to 0.3 μm. Application of steps 12-18 multiple times can provide PLZT layers having thicknesses of 1 μm to 20 μm, or more, with high optical quality.

For opto-electronic and regular electronic devices integrated in high density on substrates (LSI, VLSI, ULSI scales of integration), the coating step (12, FIG. 2) preferably comprises a conventional spin-coating process, where the precursor solution is dispensed and/or sprayed onto the top surface of a substrate while the substrate is spun at high speed, such as 1,000 revolutions per minute (rpm) or more, and preferably less 2,000 rpm, for 30 seconds to three minutes. As an example provided below, the precursor solution is dispensed on the substrate, followed by spinning the substrate at 1600 rpm for one minute. The spin coating provides for a substantially uniform coating over the wafer. As another approach, the precursor solution may be coated by a highly uniform spray or mist. This approach is conducive to "conveyor-belt" mass-production implementations, where substrates are transported by one or more conveyor belts from one processing step to the next. The spray approach is suitable for large-scale integration (LSI) of optical components, and medium-scale integration (MSI) of optical components. Finally, for low-scale integration of optical components and passive optical components, the substrate may be dip coated. As used herein and in the claims, the term "substrate" is a generic term encompassing any item on which a PLZT layer according to the present invention is formed. For example, but not limited thereto, the term "substrate" encompasses flat, plate-shaped wafers, whether formed of a single material or of many layers of different materials.

The soft-baking step (14, FIG. 2) preferably comprises heating the material layer to a temperature above room temperature (25° C.) and less than or equal to 400° C. for a first period of time, depending upon the layer thickness and temperature. Generally, the temperature is above the boiling points of the primary solvents of the precursor solution major. For layers with a thickness of around 0.1 μm to 0.3 μm, and the highest boiling point of the solvents in the range of 150° C. to 180° C., the soft-bake temperature can range from 200° C. to 400° C., and the soft-bake time can range from 2 minutes to 15 minutes, with the longer soft-bake times being used with lower soft-bake temperatures. As an example, the inventors have used 2.5 minutes at 400° C. Generally, the soft-bake temperature may be set at 75° C. to 125° C. above the highest boiling point of the solvents. The soft-baking is generally performed under standard atmospheric pressure, but may be done under a partial vacuum. During the soft-bake step, free solvent molecules, which are organic molecules that are not bonded to any of the metal atoms, are evaporated off. At the higher soft-bake temperatures, it is believed by the inventors that at least some of the chelating agents (i.e., chelating ligands) may de-bonded from the metal atoms, and evaporated off. Such chelating agents may comprise acetate, acetylacetonate, and diol compounds, as briefly described above, and as more fully described below.

In the firing step (16, FIG. 2), which follows the pre-baking step, the soft-baked material layer is heated to a firing temperature of 500° C. or more in an oxygen-rich atmosphere for a period of time (the "firing time"). The material is preferably heated relatively quickly at a rate of at least approximately 10° C. per second, and preferably at a rate of not more than approximately 60° C. This can be readily accomplished by using commercially available rapid-thermal processing equipment. The material layer is preferably heated to the firing temperature shortly after the soft-baking step, so that the material layer is already at a temperature in the range of 100° C. to 400° C. at the start of the firing step. In order to reduce thermally-induced mechanical stress on the material layer and underlying substrate, a lower heating rate may be used when the initial temperature of the material layer is below approximately 200° C. With some types of rapid-thermal processing equipment, the soft-baking step and firing step may be carried out in the same processing chamber, and thus the temperature of the material layer at the start of the firing step may be substantially the same as the temperature of the material layer at the end of the soft-bake step. An exemplary firing step may comprise heating the material layer to a temperature in the range of 600° C. to 700° C. at a rate of at least 10° C. per second, and typically at a rate in the range of 20° C. per second to 50° C. per second, and more typically at a rate in the range of 30° C. per second to 40° C. per second. In preferred embodiments, the temperature window of the firing step is in the range of 620° C. to 670° C.

It is believed that the rapid heating process has the advantages of: (1) providing better control over the final lead concentration in the layers, (2) producing less stress between layers in multiple-layer formation processes for thick films, and (3) shortening the processing time (higher throughput) for the formation of thick films. It is further believed that combination of the rapid heating process and the oxygen-rich atmosphere (discussed further below) provides the additional advantage of making the PLZT layer more transparent through less evaporation of lead (Pb).

As indicated above, the firing step preferably occurs in an oxygen-rich atmosphere. As used herein, "oxygen-rich atmosphere" means a processing atmosphere (at the firing temperature) having a molar fraction of oxygen that is greater than the molar fraction of oxygen found in the Earth's atmosphere, which is currently 0.21. An oxygen-rich environment may be produced by feeding oxygen into the processing chamber, along with an ambient air stream or not. Preferably, the atmosphere in the firing chamber has an oxygen molar fraction of at least 0.4, and more preferably of at least 0.6, and most preferably of at least 0.9. In addition, the pressure of the atmosphere is at least 80% of Standard Atmospheric Pressure, the latter of which is 760 torr (corresponding to $1.013 \times 10^5$ Pascal). Thus, using the upper temperature value of 700° C. at a pressure of 1.0 Standard Atmosphere Pressure, the concentration of oxygen in the atmosphere of the firing chamber is at least 0.0021 moles/liter (0.21 mole fraction), is preferably at least 0.04 moles/liter (0.4 mole fraction), is more preferably at least 0.06 moles/liter (0.6 mole fraction), and is most preferably at least 0.09 moles/liter (0.9 mole fraction). As is well known to the art, mole fraction and mole concentrations may be set by the flow rates of gases into the firing chamber. At Standard Atmosphere Pressure (760 torr), the molar fractions of 0.4, 0.6, and 0.9 correspond to partial pressures of 300 torr, 450 torr, and 680 torr, respectively (1 torr=133.9 Pascal).

After the firing step, the material layer has a polycrystalline morphology (form) comprising grains of crystalline material. That is to say, this is a non-amorphous microstructure comprising grains of crystalline PLZT material. The crystal structure of each grain comprises a perovskite structure, which is shown in FIG. 1, with "B"-site vacancies according to the amount of lanthanum present, as indicated above.

Having generally described the above coating, soft-bake, and firing steps, we provide an exemplary set of such steps that we have found to provide good results. Using a precursor solution of 25% excess lead (Pb), a layer of precursor material was spin-coated at 1,600 rpm for one minute, soft-baked at 400° C. for 2.5 minutes, and fired at 645° C. for one minute in a rapid thermal processing infrared-radiation (IR) furnace. There was little time between the soft-bake step and the firing step, and the temperature ramp rate was in the range of 30° C. per second to 40° C. per second. The thickness of the layer was around 0.2 µm. After a cooling period to a temperature preferably below 40° C., these steps may be repeated to form additional layers, so as to build a thick composite layer of PLZT material with high transparency.

Formation of the Optical Precursor Solutions

We first describe the general formation methods, followed by detailed examples. The methods form a solution comprising lead atoms, lanthanum atoms, zirconium atoms, titanium atoms, and one or more diol compounds. Each method comprises a step of mixing lead acetate, lanthanum acetylacetonate, and a first diol to form a first solution, such that the lead acetate and lanthanum acetylacetonate are preferably completely dissolved in the first solution (i.e., no visible sign, as viewed by ordinary sight, of the initial solid form of the chemical compound). The methods further comprise a step of mixing zirconium n-propoxide, titanium di-isopropoxide bis-acetylacetonate, and a second diol to form a second solution such that the zirconium n-propoxide and titanium di-isopropoxide bis-acetylacetonate are preferably completely dissolved in the second solution. These solutions may be formed in any order, or formed substantially at the same time. Next, the methods comprise a step of combining the first and second solutions and refluxing at a temperature above room temperature to form a third solution, which is the precursor solution. In preferred embodiments, the refluxing process may occur at a temperature above 75° C. As to the first and second solutions; the first and second diols used in these solutions are preferably the same, but they may be different. In preferred embodiments, the first solution is mixed at a temperature above 125° C., and the second solution is mixed at a temperature above 75° C. In both cases, the mixing may occur under refluxing conditions.

While this aspect of the present invention is preferably practiced with the chemical compounds being completely dissolved in their respective first and second solutions, it may be appreciated that only portions of the compounds need be dissolved in the first and second solutions. The subsequent refluxing process provides additional time to dissolve the solid compounds, if needed. Preferably, at least 97% of each compound is dissolved in its respective first or second solution, and more preferably at least 99% of each compound is dissolved, and most preferably each compound is completely dissolved, as determined by ordinary sight (100% dissolved or very close thereto). Best results to date have been obtained when the compounds have been completely dissolved.

Prior to performing the step of forming the first solution, the preferred methods comprise a step of drying lanthanum acetylacetonate hydrate prior to producing lanthanum acetylacetonate, with the drying step preferably exposing the lanthanum acetylacetonate hydrate to a temperature equal to or greater than 50° C. and a vacuum equal to or less than $5 \times 10^{-1}$ mbar (1 mbar=100 Pa=0.75 torr). These preferred methods also comprise a step of drying lead acetate trihydrate to produce the lead acetate, with the drying step exposing the lead acetate trihydrate to temperature equal to or greater than 50° C. and a vacuum equal to or less than $5 \times 10^{-1}$ mbar. In these and other preferred embodiments, the step of forming the second solution comprises a step of refluxing the zirconium n-propoxide with acetylacetone prior to mixing the zirconium n-propoxide with the titanium di-isopropoxide bis-acetylacetonate and the second diol.

The ratio of the chemical components is selected according to relationships (1)-(6) expressed above, and to meet at least one of the above ranges of lead (Pb) concentration. For example, a stoichiometric target $ST_{Pb}$ for the number of lead atoms mixed for the first solution is established for the first solution for the amount of desired excess lead. As explained above, that stoichiometric target $ST_{Pb}$ is equal to the number of zirconium atoms mixed for the second solution plus the number of titanium atoms mixed for the second solution, minus 75% of the number of lanthanum atoms mixed in the first solution. The numbers of zirconium atoms, titanium atoms, and lanthanum atoms may be set according to the ranges and relationships (1)-(6) expressed above. The number of lead (Pb) atoms mixed for the first solution is then set in the range of 122% to 130% of the stoichiometric target, and more preferably in the range of 123% to 128% of the stoichiometric target. As indicated above, the best results to date were found with the number of lead atoms mixed in the first solution being in the range of 124% to 126% of the stoichiometric target.

EXAMPLES

Having generally described the methods of making the precursor solutions, methods of forming four exemplary PLZT precursor solutions are presented. The four are formulated for a target PLZT composition of $Pb_{0.92}La_{0.08}(Zr_{0.65}Ti_{0.35})_{0.98}O_3$, with the first having 20% excess lead, the second having 25% excess lead, and the third having 30% excess lead, and the fourth having 40% excess lead. For each PLZT precursor solution, two separate solutions were initially created, one comprising lead (Pb) and Lanthanum (La) and the other comprising zirconium (Zr) and titanium (Ti), as outlined above. The two separate solutions were subsequently combined. The processing of each solution is described, with the understanding that the processing of the solutions may occur simultaneously or in any order.

Pb—La Solution Processing

Lead acetate trihydrate $Pb(CH_3COO)_2 \cdot 3H_2O$ (Aldrich) and lanthanum acetylacetonate hydrate $[La(C_5H_7O_2)_3] \cdot xH_2O$ (Aldrich) were separately dried at 75° C. for at least 20 hours under vacuum. The vacuum was less than or equal to $5 \times 10^{-3}$ mbar (0.5 Pa), but can be less than $5 \times 10^{-1}$ mbar (50 Pa). Before the drying step, the amounts of lead acetate trihydrate and lanthanum acetylacetonate hydrate were weight out to obtain the relative molar amounts of Pb and La as indicated in Table 1.

TABLE 1

| Precursor Solution Number | Excess Pb | Pb Relative Molar Amount | La Relative Molar Amount |
|---|---|---|---|
| 1 | 20% | 13.80 | 1.00 |
| 2 | 25% | 14.375 | 1.00 |
| 3 | 30% | 14.95 | 1.00 |
| 4 | 40% | 16.10 | 1.00 |

Figure 4:
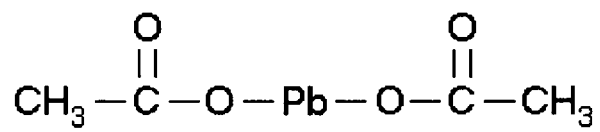
FIG. 4 shows the chemical structure of lead acetate resulting from the drying step according to an invention of the present application.
Figure 5:
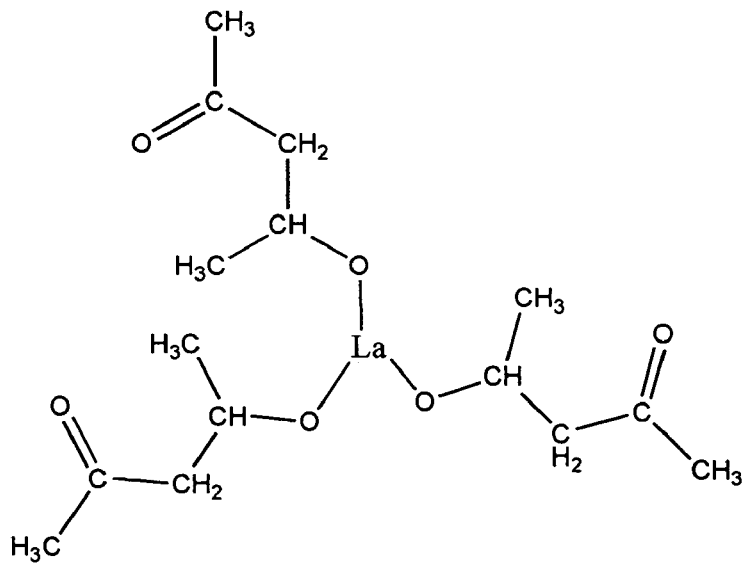
FIG. 5 shows the chemical structure of lanthanum acetylacetonate resulting from the drying step according to an invention of the present application.

The chemical structure of the resulting lead acetate is shown in FIG. 4, and the chemical structure of the resulting lanthanum acetylacetonate is shown in FIG. 5.

With minimal exposure to air and moisture, the dried lead acetate and lanthanum acetylacetonate were mixed together with 1,3-propanediol (HO—$(CH_2)_3$—OH, Aldrich Co., purity 98%) in a 1:3 molar ratio of (Pb+La) to 1,3-propanediol, and then heated under reflux conditions for 2 hours t form a lead-lanthanum precursor solution. The reflux temperature was around 170° C. to 180° C. After the reflux process, several chelated complexes are possible in the solution. For example, a portion of the lead acetate molecules can be linked to respective lanthanum acetylacetonate molecules by respective 1,3-propanediol molecules at their OH groups to form a first type of chelated complex. Another portion of the lead acetate molecules can be linked to one another by respective 1,3-propanediol molecules at their OH groups to form a second type of chelated complex. Also, a portion of the lanthanum acetylacetonate molecules can be linked to one another by respective 1,3-propanediol molecules at their OH groups to form a third type of chelated complex. There can also be further linking of these chelated complexes in a variety of combinations. Finally, portions of the lead acetate molecules and lanthanum acetylacetone molecules can be dissolved in the 1,3-propanediol in unlinked states, with the possibility of some of diol molecules being linked to some of the dissolved lead acetate molecules and lanthanum acetylacetonate molecules.

Zr—Ti Solution Processing

Figure 6:
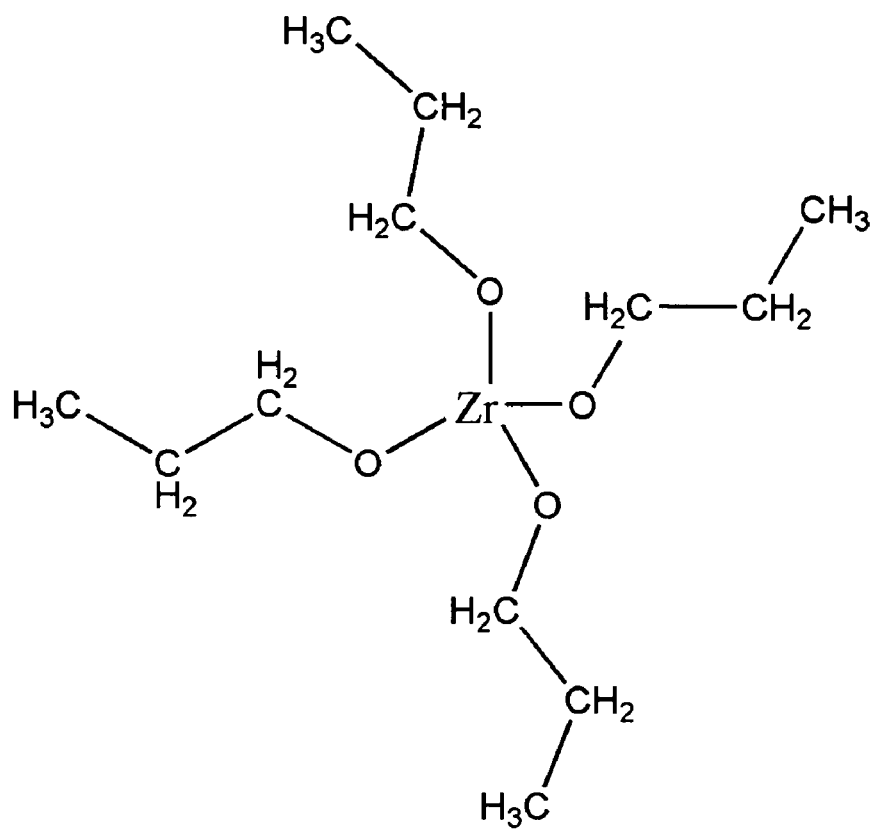
FIG. 6 shows the chemical structure of zirconium n-propoxide $Zr(OC_3H_7)_4$, as used by an invention of the present application.
Figure 7:
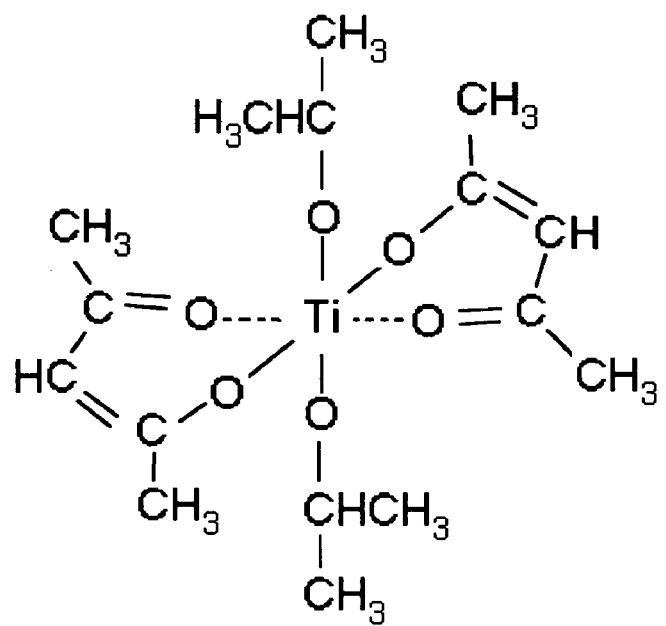
FIG. 7 shows the chemical structure of titanium di-isopropoxide bis-acetylacetonate $Ti(OC_3H_7)_2(CH_3OCHCOCH_3)_2$, as used by an invention of the present application.

The starting components of the Zr—Ti mixture are: (1) zirconium n-propoxide $Zr(OC_3H_7)_4$ (Alfa Co.), illustrated in FIG. 6, (2) titanium di-isopropoxide bis-acetylacetonate $Ti(OC_3H_7)_2(CH_3OCHCOCH_3)_2$ (Alfa Co., 75 wt. % in isopropanol), illustrated in FIG. 7, (3) 1,3 propanediol HO—$(CH_2)_3$—OH (Aldrich Co., purity 98%), and (4) acetylacetone $CH_3COCH_2COCH_3$ (Aldrich Co., purity 99+ %). Titanium di-isopropoxide bis(acetylacetonate) also goes by the name of di-isopropoxytitanium bis(acetylacetonate); zirconium n-propoxide $Zr(OC_3H_7)_4$ also goes by the name of tetrapropyl zirconate, and acetylacetone also goes by the name of 2,4-pentanedione. For each solution in Table 1, 7.963 relative molar amounts of zirconium n-propoxide and 4.288 relative molar amounts of titanium di-isopropoxide bis-acetylacetonate were measured out (the molar amounts are relative to the 1.00 molar amount of lanthanum acetylacetonate hydrate. The zirconium n-propoxide was stabilized by refluxing with acetylacetone in a 1:2 molar ratio to promote the partial exchange of the n-propoxy groups by acetylacetonate groups. The reflux temperature was at around 100-110° C. This zirconium complex was then mixed with the measured amount of titanium di-isopropoxide bis-acetylacetonate and with 1,3-propanediol, in a ratio of 2 moles of 1,3-propanediol per one mole of combined zirconium and titanium (Zr+Ti). The mixture was heated under reflux conditions for 2 hours to form a zirconium-titanium precursor solution. The reflux temperature was at around 110° C. to 120° C.).

Combination of Precursor Solutions.

The lead-lanthanum precursor solution and the zirconium-titanium solution were then combined while at an elevated temperature of approximately 80° C., and then refluxed for 5 hours, with one distillation after 2 hours.

Experimental Results

Thick PLZT layers were then formed on LSAT (LaSrAlTaO$_3$) single crystal substrates using each of the above three exemplary precursor solutions. The single crystal substrates were 2-inch diameter LSAT (($La_{0.18}Sr_{0.82})(Al_{0.59}Ta_{0.41})O_3$, MTI Crystal) coated with $LaNiO_3$ bottom electrode. The conductive $LaNiO_3$ bottom electrode was prepared from one of the methods described in co-pending U.S. patent application Ser. No. 10/807,605, entitled "Methods of Forming $LaNiO_3$ Conductive Layers, Ferro-Electric Devices with $LaNiO_3$ layers, and precursor formation solutions," by Kuo-Chuan Liu, et al., the whole contents of which are incorporated herein by reference. PLZT precursor layers were formed by dispensing the corresponding precursor solution onto the substrate, and spinning the substrate at 1600 rpm for one minute. Thereafter, the layer was baked at 400° C. for 2.5 minutes, and fired at 645° C. for one minute in a rapid thermal processing IR furnace with the mole fraction of oxygen being at or above 0.9, and with the atmospheric pressure in the chamber near 1.0 Standard Atmospheric Pressure. The substrate was then cooled to near room temperature (below 40° C.), with the layer having a thickness of approximately 0.2 µm. These steps were repeated 49 times to form 50 layers of PLZT material on each substrate, for a total thickness of around 10 to 11 µm. A comparative example using 20% excess lead was also made, using the above steps, but with a different precursor solution.

Loss measurement was carried out by using various lengths of slab waveguide and measuring the light intensity (1550 nm) at the end of the waveguide. The loss factor for the layer formed from 20% excess-lead precursor was found to be 0.7 dB/mm. This was better than the value of 2 dB/mm generally found in the prior art for PLZT formed by epitaxial growth methods. As an unexpected result, the loss factor for the layer formed from 25% excess-lead precursor was found to be 0.25 dB/mm to 0.28 dB/mm. This was unexpected since only a 5% increase in the excess lead caused a 62% decrease in the loss factor (i.e., caused the loss to be reduced by a factor of 2.6). The loss factors for the layers formed from 30% excess-lead precursor and 40% excess-lead were at 0.45 dB/mm (±0.05 dB/mm) and 0.7 dB/mm, respectively. A pyrochlore phase (a lead-rich non-ferroelectric crystalline phase) was observed in the layers formed from the 30% excess lead and 40% excess lead precursors, and this pyrochlore phase is believed to have caused the increase in the loss factors for these layers compared to the loss factor of the layer formed from the 25% excess-lead precursor. Nonetheless, the layer formed from 30% excess lead had a significantly lower loss factor than layers formed from 20% excess lead, and from the prior art layers formed by epitaxial growth. This result was unexpected.

From these results and other portions of his work, the inventor currently believes that precursor solutions with 22% to 30% excess lead (Pb) provide PLZT layers with low-loss optical properties of 1 dB/mm and less, that precursor solutions with 23% to 28% excess lead provide PLZT layers with improved properties (lower optical loss of 0.6 dB/mm and less and little pyrochlore phase), and that precursor solutions with 24% to 26% excess lead provide PLZT layers with further improved properties (lowest optical loss of 0.4 dB/mm and less and substantially no pyrochlore phase). In addition, measured results showed that the $r_{33}$ electro-optic optic coefficient of the PLZT layer formed from the precursor with 25% excess lead was as high as 121 pm/V in the voltage range of 0 to 100V over a thickness of 10 µm (pm=pico-meters). The $r_{33}$ electro-optic coefficient for layers formed from the 30%-excess-lead and the 40% excess-lead were somewhat lower due to the presence of the pyrochlore phase (116 pm/V and 104 pm/V, respectively). For the PLZT layers constructed on the $LaSrAlTaO_3$ substrate, the value of the $r_{33}$ electro-optic coefficient is pertinent to the propagation of the transverse-magnetic (TM) mode of light. Also, measured results showed that the $r_{13}$ electro-optic coefficient of the PLZT layers formed from the precursor with 25% excess lead was as high as 12 pm/V in the voltage range of 100V to 200V. The $r_{13}$ electro-optic coefficient values for the PLZT layers formed from the 30% and 40% excess lead precursors were as high as 8 pm/V and 13.4 pm/V, respectively. For the PLZT layers constructed on the $LaSrAlTaO_3$ substrate, the value of the $r_{13}$ electro-optic coefficient is pertinent to the propagation of the transverse-electric (TE) mode of light.

Device Structures

Figure 8:
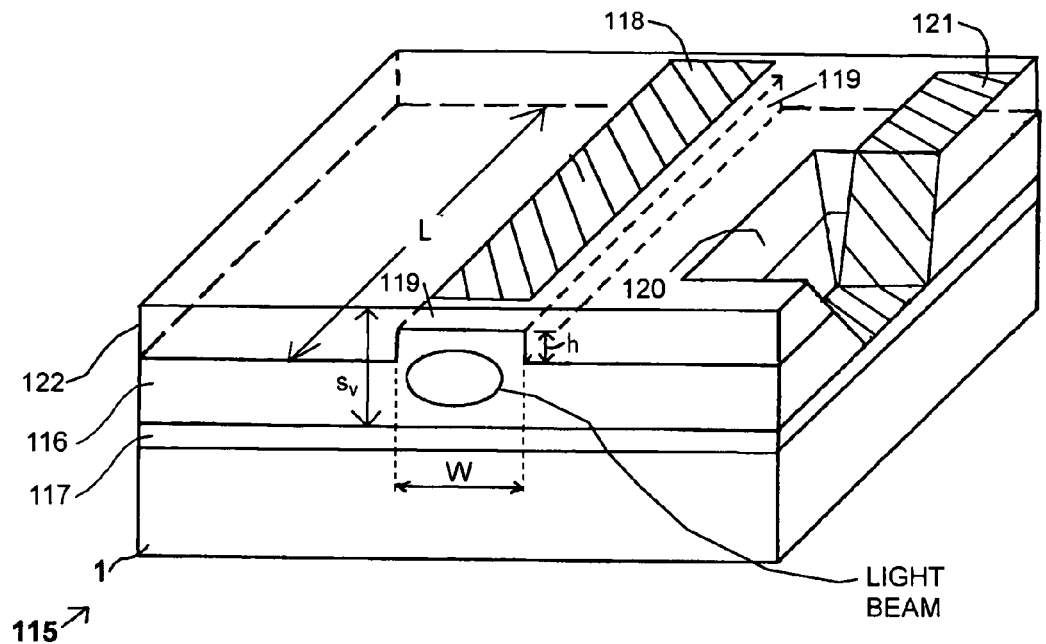
FIGS. 8 and 9 show exemplary device structures according to aspects of the present application.

FIG. 8 shows a part 115 of an electro-optic device according to an aspect of the present invention that incorporates a single layer or composite layer of PLZT material 116 and two vertically-oriented electrodes: bottom electrode 117 and top electrode 118. Part 115 may be incorporated into an interferometer-type optical switch, a polarization-type modulator, as well as other types of devices. Bottom electrode 117 preferably comprises lanthanum nickel oxide ($LaNiO_3$), which is conductive, and is formed over a dielectric crystalline substrate 1 by methods described in co-pending U.S. patent application Ser. No. 10/807,605, more fully identified above. Bottom electrode 117 comprises grains of crystalline material (i.e., is non-amorphous), with the crystal lattice constant being closely matched to that of substrate 1, and with the crystal orientation of the grains closely following the crystal orientation of substrate 1. PLZT 116 may be formed by any of the above-described methods, preferably using the precursor solutions described above. It is formed over bottom electrode 117, which has crystal lattice constant closely matched to that of the PLZT material. PLZT material 116 is thereby formed with grains of material having substantially the same crystal orientation as the underlying electrode and substrate.

After PLZT layer 116 is initially formed, it is pattern-etched to form a mesa stripe 119 having a width W, a length L, and a height h. In use, a light beam will be conveyed through mesa stripe 119 along the length L. After that, an upper cladding layer 122 is formed. PLZT layer 116 of mesa stripe 119 has a refractive index that is higher than that of substrate 1, and higher than that of upper cladding layer 122. The higher refractive index provides vertical confinement of the light beam within the space below the top of mesa stripe 119. The step difference in height h causes the refractive index of PLZT material layer 116 underneath mesa stripe 119 to be higher than that of PLZT material layer 116 to the side of mesa stripe 119, which provides lateral confinement of the light beam within the space below the top of mesa stripe 119. After upper cladding layer 122 is formed, an aperture 120 is formed through upper cladding layer 122 and PLZT material layer 116, to the side of mesa stripe 119, so as to expose a portion of bottom electrode 117. Finally, top electrode 118 is formed over the top surface of upper cladding layer 122 in substantial alignment to the top surface of mesa stripe 119, and a conductive layer 121 is formed through via 120 so as to contact the exposed portion of bottom electrode 117. In this configuration, a voltage may be applied between top electrode 118 and bottom electrode 117 by providing the voltage to electrode 118 and conductive line 121. While part 115 has been illustrated with electrodes 117, 118 and mesa 119 having rectangular shapes, it may be appreciated that the geometry of these components may be modified to suit the particular application for part 115. For example, some prism deflector devices use triangular-shaped electrodes, and some branching devices use "Y"-shaped mesas.

Figure 9:
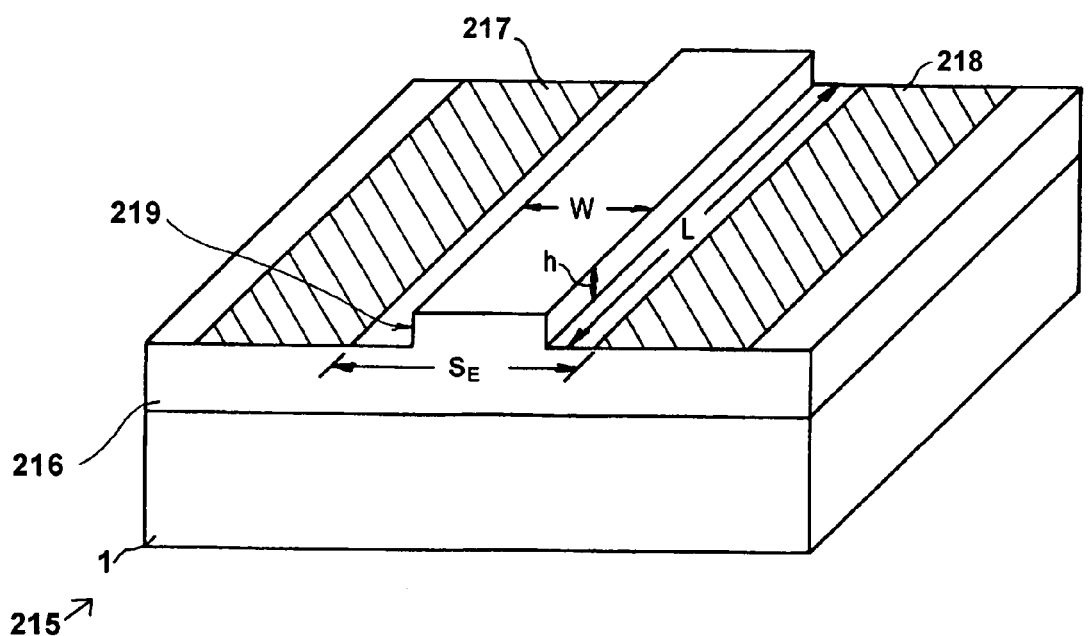

The separation distance between electrodes 117 and 118 through mesa 119 and upper cladding layer 122 is indicated as distance $S_V$ in FIG. 2. This distance can typically range from 1 µm to 20 µm, depending upon the application of part 115. This distance is significantly shorter than the electrode spacing in a conventional device where the left and right side electrodes are used instead of top and bottom electrodes (FIG. 9 shows left and right electrodes 217 and 218). Because of the small value of distance $S_V$, top and bottom electrodes 117 and 118 can generate an electric field of high magnitude with a relatively low voltage. In addition, the $r_{33}$ electro-optic coefficient of the PLZT material 116 is aligned perpendicular to the surfaces of electrodes 117 and 118, and to the light propagation direction, for maximum advantage. In other words, the vertical orientation of electrodes 117 and 118 is aligned with a larger E/O coefficient of the material's tensor matrix, which causes the material to undergo a greater change in optical properties for the same level of electric field. Accordingly, with the topology shown in FIG. 8 according to the present inventions, electro-optic devices can be made more efficient, more responsive, and more compact. Furthermore, the topology enables large-scale integration of electro-optic devices on a single carrier substrate (e.g., substrate 1). In this regard, a pattern etch may be applied to bottom electrode 117 before PLZT material layer 116 is formed so as to electrically isolate the bottom electrodes of various devices from one another. In addition, the topology of FIG. 8 may be used in various electrical, magnetic, electro-optic, electromagnetic, and electro-mechanical devices.

FIG. 9 shows a part 215 of an electro-optic device according to an aspect of the present invention that incorporates a single layer or composite layer of PLZT material 216 and two horizontally-oriented electrodes: left electrode 217 and right electrode 218. Part 215 may be incorporated into an interferometer-type optical switch, a polarization-type modulator, as well as other types of devices. This embodiment illustrates that aspects of the present invention may be utilized in prior art electrode topologies. An advantage of this configuration is a shorter processing cycle since there is no need to formed an upper cladding layer (although one may form one if desired).

PLZT material 216 is formed as a layer over dielectric crystalline substrate 1, without an intervening bottom electrode. The crystal lattice constant of PLZT material layer 216 and substrate 1 are closely matched, and material 216 is formed with a crystal orientation that is set by the crystal orientation of substrate 1. After material layer 216 is initially formed, it is pattern-etched to form a mesa ridge 219 between the locations where electrodes 217 and 218 are to be formed. Mesa ridge 219 has a width W, a length L, and a height h. In use, a light beam will be conveyed through mesa 219 along its length L. PLZT material 216 of mesa 219 has a refractive index that is higher than that of substrate 1, and higher than that of the air above mesa 219 (in this case, the air effectively acts as an upper cladding layer). The higher refractive index provides vertical confinement of the light beam within mesa 219. The step difference in height h causes the refractive index of the material 216 underneath mesa 219 to be higher than that of material 6 that is to the side of mesa 219, which provides lateral confinement of the light beam within mesa 219. After mesa 219 is formed, electrodes 217 and 218 are formed, and are separated by a distance $S_E$. The electrodes generate an electric field along distance $S_E$, which can then be used to modify the optical properties (e.g., refractive index, polarization) of PLZT material 216 within the lower part of mesa 219.

Thus, the examples above illustrate that the present invention enables the construction of optical devices that have a substrate, a layer of PLZT of high optical transparency and quality, formed over the substrate, with one or more electrodes formed in proximity to the PLZT layer to affect its optical properties. As indicated above, formation methods according to aspects of the present invention provide PLZT material having a non-amorphous microstructure that comprises grains of crystalline material, with the layer further having a loss factor equal to or less than 1 dB/mm for light having a wavelength of 1550 nm.

Exemplary $LaNiO_3$ Electrode Formation

For the benefit of the reader who may not have quick access to co-pending U.S. patent application Ser. No. 10/807,605, we describe herein exemplary precursor solutions and methods for bottom electrodes of lanthanum nickel oxide ($LaNiO_3$), over which the PLZT material layers according to the present inventions may be formed.

Bottom electrode 117 is preferably formed by coating a substrate 1 of $SrTiO_3$ or $LaAlO_3$ with a viscous liquid that comprises equal amounts of lanthanum and nickel atoms in a mixture of chelated complexes and solvent(s), which will be described below in greater detail. The coating is preferably done by spin coating, but other formation methods may be used. The coated layer is then soft-baked to remove the solvents that are in the viscous liquid. The soft-bake temperature is generally set at a value slightly to moderately above the boiling point of the solvents. Typically, the soft-bake is performed above about 200° C. and below about 400° C., inclusive of these values, for a time sufficient to remove the solvents (which generally depends upon layer thickness and solvent content). The time is generally in the range of one minute to several minutes. Next, the layer is fired at (i.e., heated to) a high temperature in an oxygen-rich environment (i.e., under oxygen flow). The firing temperature is typically between 600° C. and 900° C., and is preferably between 700° C. and 800° C. Both the soft-bake and firing steps may be performed within a rapid thermal process furnace (RTP) with quartz chamber under oxygen flow. To achieve a smoother surface morphology, the above coating, soft-bake, and firing steps are repeated one or more times. The firing step decomposes the organic components in the metal complexes originally present in the dispensing solution, and causes the metal atoms and oxygen atoms to form crystal grains of $LaNiO_3$. A higher firing temperature generally provides better crystal formation in the $LaNiO_3$ layer. The firing time is generally on the order of 5 minutes to 25 minutes, with 15 minutes being a median value. With bottom electrode 117 so formed, PLZT layer 116 may be formed over it.

A lanthanum nickel oxide precursor can be prepared by using 1,3-propanediol (diol). Lanthanum acetylacetonate hydrate (Aldrich) and nickel acetate tetrahydrate (98%, Aldrich), in a 1:1 molar ratio to one another, are separately dried at 75° C. for 8 hours under vacuum. Next, the dried lanthanum acetylacetonate is dissolved in 1,3-propanediol (98%, Aldrich) at a molar ratio of 1 to 35 with 3 ml of nitric acid under reflux conditions at a temperature of around the boiling point of 1,3-propanediol (214.4° C.) for 30 minutes. The nitric acid, acting as a catalyst, facilitates the dissolving of the lanthanum acetylacetonate in 1,3-propanediol. This step cases various chelated forms of lanthanum atoms to form. Also as a next step, dried nickel acetate is refluxed with a mixture of 1:5 volume ratio of 1,3-propanediol and 2,4-pentanedione at a temperature of around the boiling point of 2,4-pentanedione (140.4° C.) for 30 minutes. This step cases various chelated forms of nickel atoms to form.

After the above two refluxing steps have been completed, which may be done in any order or simultaneously, two non-opaque solutions were obtained. The two solutions were then mixed and refluxed at a temperature of around the boiling point of 2,4-pentanedione (140.4° C.) for 60 minutes. This results in some of the nickel chelates and lanthanum chelates linking together to form long chains of chelated nickel and lanthanum atoms. After the second reflux operation, a dark green solution resulted. The solution had a concentration of approximately 0.18 M. The La—Ni complex solution was filtered through a 0.45 µm-sized filter (polyvinylidene fluoride, PVDF, Whatman).

The solution may then be dispensed on substrates according to the methods outlined above to formed electrodes 117. As an example, the solution can be spin coated on the substrate at a speed of 1500 rpm for 60 seconds. The layer may then be soft-baked and fired within a rapid thermal process furnace (RTP) with quartz chamber under oxygen flow. The heating profile has a one-minute soft-bake step at 350° C., and a 15-minute firing step at 850° C. With this method and precursor solution, the inventor was able to achieve low resistivities of 312 µΩ·cm and 237 µΩ·cm for LaNiO$_3$ layers formed on SrTiO$_3$ and LaAlO$_3$ substrates, respectively (1 µΩ=1×10$^{-6}$ Ω).

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of forming a PLZT layer comprising the steps of:
   (a) coating a substrate with a solution that comprises lead atoms, lanthanum atoms, zirconium atoms, titanium atoms, and one or more diol compounds to form a material layer, wherein the solution has a stoichiometric target for the number of lead atoms, the stoichiometric target being equal to the number of zirconium atoms plus the number of titanium atoms minus 75% of the number of lanthanum atoms, wherein the number of lead atoms in the solution is in the range of 122% to 130% of the stoichiometric target;
   (b) heating the material layer to a temperature above room temperature and less than or equal to 400° C. for a first period of time; and
   (c) thereafter heating the material layer at a rate of at least 10° C. per second to a temperature of 600° C. or more in an oxygen-rich atmosphere for a subsequent second period of time.

2. The method of claim 1 wherein step (c) does not last more than four minutes.

3. The method of claim 2 wherein the number of lead atoms in the solution is in the range of 123% to 128% of the stoichiometric target.

4. The method of claim 2 wherein the number of lead atoms in the solution is in the range of 124% to 126% of the stoichiometric target.

5. The method of claim 1 wherein step (c) comprises heating the material layer to a temperature in the range of 600° C. to 700° C.

6. The method of claim 1 wherein step (c) comprises heating the material layer to a temperature in the range of 620° C. to 670° C.

7. The method of claim 1 wherein step (c) comprises heating the material layer to a temperature in the range of 600° C. to 700° C. at a rate in the range of 20° C. per second to 50° C. per second.

8. The method of claim 1 wherein step (c) comprises heating the material layer to a temperature in the range of 600° C. to 700° C. at a rate in the range of 30° C. per second to 40° C. per second.

9. The method of claim 1 wherein step (c) comprises heating the material layer to a temperature in the range of 620° C. to 670° C. at a rate in the range of 30° C. per second to 40° C. per second.

10. The method of claim 1 wherein the atmosphere in step (c) has an oxygen mole fraction of at least 0.4.

11. The method of claim 1 wherein the atmosphere in step (c) has an oxygen mole fraction of at least 0.6.

12. The method of claim 1 wherein the atmosphere in step (c) has an oxygen mole fraction of at least 0.9.

13. The method of claim 1 wherein the atmosphere in step (c) has an oxygen concentration of at least 0.04 moles/liter.

14. The method of claim 1 wherein the atmosphere in step (c) has an oxygen concentration of at least 0.06 moles/liter.

15. The method of claim 1 wherein the atmosphere in step (c) has an oxygen concentration of at least 0.09 moles/liter.

16. The method of claim 1 wherein the pressure of the atmosphere in step (c) is at least 80% of Standard Atmospheric Pressure.

17. A method of forming a PLZT layer comprising the steps of:
   (a) coating a substrate with a solution that comprises lead atoms, lanthanum atoms, zirconium atoms, titanium atoms, and one or more diol compounds to form a material layer, wherein the solution has a stoichiometric target for the number of lead atoms, the stoichiometric target being equal to the number of zirconium atoms plus the number of titanium atoms minus 75% of the number of lanthanum atoms, wherein the number of lead atoms in the solution is in the range of 122% to 130% of the stoichiometric target;
   (b) heating the material layer to a temperature above room temperature and less than or equal to 400° C. for a first period of time;
   (c) heating the material layer to a firing temperature of 600° C. or more in an oxygen-rich atmosphere for a subsequent second period of time, the material layer being heated to the firing temperature at a rate of at least 10° C. per second;
   (d) cooling the material layer to a temperature below 40° C.;
   (e) repeating steps (a)-(d) a plurality of times to form additional material layers.

18. The method of claim 17 wherein the number of lead atoms in the solution is in the range of 123% to 128% of the stoichiometric target.

19. The method of claim 17 wherein step (c) comprises heating the material layer to a temperature in the range of 620° C. to 670° C. at a rate in the range of 20° C. per second to 50° C. per second.

20. The method of claim 17 wherein the atmosphere in step (c) has an oxygen mole fraction of at least 0.6.

21. The method of claim 17 wherein the number of lead atoms in the solution is in the range of 124% to 126% of the stoichiometric target.

22. The method of claim 17 wherein step (c) comprises heating the material layer to a temperature in the range of 600° C. to 700° C.

23. The method of claim 17 wherein step (c) comprises heating the material layer to a temperature in the range of 620° C. to 670° C.

24. The method of claim 17 wherein step (c) comprises heating the material layer to a temperature in the range of 600° C. to 700° C. at a rate in the range of 20° C. per second to 50° C. per second.

25. The method of claim 17 wherein step (c) comprises heating the material layer to a temperature in the range of 600° C. to 700° C. at a rate in the range of 30° C. per second to 40° C. per second.

26. The method of claim 17 wherein step (c) comprises heating the material layer to a temperature in the range of 620° C. to 670° C. at a rate in the range of 30° C. per second to 40° C. per second.

27. The method of claim 17 wherein the atmosphere in step (c) has an oxygen mole fraction of at least 0.4.

28. The method of claim 17 wherein the atmosphere in step (c) has an oxygen mole fraction of at least 0.6.

29. The method of claim 17 wherein the atmosphere in step (c) has an oxygen mole fraction of at least 0.9.

30. The method of claim 17 wherein the atmosphere in step (c) has an oxygen concentration of at least 0.04 moles/liter.

31. The method of claim 17 wherein the atmosphere in step (c) has an oxygen concentration of at least 0.06 moles/liter.

32. The method of claim 17 wherein the atmosphere in step (c) has an oxygen concentration of at least 0.09 moles/liter.

33. The method of claim 17 wherein the pressure of the atmosphere in step (c) is at least 80% of Standard Atmospheric Pressure.

34. The method of claim 17 wherein step (c) does not last more than four minutes.

* * * * *